Patented Jan. 16, 1951

2,538,298

UNITED STATES PATENT OFFICE 2,538,298

PRODUCTION OF POLYNITRO ORGANIC COMPOUNDS

William I. Denton, Woodbury, Richard B. Bishop, Haddonfield, and Edwin M. Nygaard, Woodbury, N. J., assignors to Socony-Vacuum Oil Company, Incorporated, a corporation of New York No Drawing. Application March 20, 1947, Serial No. 736,104

6 Claims. (Cl. 260—644)

This invention relates to a method of obtaining improved yields of secondary or tertiary polynitro organic compounds from organic compounds containing a lesser number of nitro groups. It will be specifically described as a method of preparing 2,2-dinitropropane from propane and 2-nitropropane, but is applicable to the preparation of any other secondary or tertiary polynitro organic compound.

The production of 2,2-dinitropropane from 2-nitropropane and the production of other polynitroparaffins from nitroparaffins having a lesser number of nitro groups has been described in United States patent application Serial No. 613,713, filed August 30, 1945, by Edwin M. Nygaard et al., and United States patent application Serial No. 613,712, filed August 30, 1945, by William I. Denton et al. According to these applications, 2-nitropropane can be converted into 2,2-dinitropropane by nitrating at temperatures between 150° C. and 250° C. and at pressures above 150 pounds per square inch, and using as nitrating agents nitric acids of various concentrations or oxides of nitrogen.

The production of 2,2-dinitropropane and of 2-nitropropane from propane, and the production of other polynitro and mononitro paraffins from paraffinic hydrocarbons has been described in United States patent application Serial No. 629,001, filed November 15, 1945, by Edwin M. Nygaard et al. In accordance with the process disclosed in this application, paraffins, such as propane, can be converted to mononitro paraffins, such as 2-nitropropane, and dinitroparaffins, such as 2,2-dinitropropane, under reaction conditions similar to those described above.

It has now been found that when a mixture of a mononitroparaffin and its parent paraffinic hydrocarbon is used as the charge in the process described in United States patent application Serial No. 629,001, supra, a large and unexpected increase in the efficiency of the process results. Specifically, and by way of example only, the nitration of a mixture of 2-nitropropane and propane results in far more efficient production of 2,2-dinitropropane and 2-nitropropane than can be accomplished by using either 2-nitropropane or propane alone.

Utilizing this knowledge, a continuous process has been devised which produces not only an increased yield of 2,2-dinitropropane, for example, but also 2-nitropropane in sufficient amounts so that it can be recharged into the system along with additional propane and nitrating agent, thereby obviating the necessity of supplying 2-nitropropane from an outside source.

In accordance with the present invention, the continuous process for producing polynitro organic compounds comprises passing a nitro organic compound containing a lesser number of nitro groups than the desired end product, its parent compound, and a nitrating agent, in the desired proportions, through a stainless steel reaction tube under reaction conditions which will be described in detail hereinafter. The reactor, if desired, may be packed with an inert material such as glass beads in order to increase mixing and contact surface area. The products may thereafter be condensed and separated into individual components. The reaction tube can be immersed into a molten heat transfer salt in order to obtain the desired temperature control. The pressure can be controlled by a pressure regulating valve on the outlet side of the reactor while the feed pumps suitably maintain constant proportions and amounts of the charge materials.

As indicated in the patent applications mentioned above, the preferred nitrating agent is nitric acid in a concentration ranging from forty to seventy per cent. However, other concentrations of nitric acid and also oxides of nitrogen higher than NO may be used, for example, $NO_2$, $N_2O_3$, $N_2O_4$ and $N_2O_5$. Some sulphuric acid may be present, in which case nitrosyl sulphuric acid is probably formed, but it is undesirable to have any large proportion of sulphuric acid present as it tends to oxidize the charge materials before they have had an opportunity to react with the nitrating agent.

Various molar proportions of the starting nitro compound, parent compound and of nitrating agent may be used. In general, it is preferred to have an excess of nitro compound and parent compound since this tends to control the reaction. Ratios of one-half to one mole of nitric acid to one mole total of parent compound plus nitro compound are satisfactory. We have found that as the proportion of nitric acid in the charge is increased, explosions are likely to occur. The ratio of parent compound to nitro compound preferably is regulated so as to produce a constant amount of the starting nitroparaffin for recycling. This permits the process to be operated so as to produce the desired polynitro compound as the only product.

It has been found desirable to use as a charge mixture of nitro compound and parent compound, a mixture which contains between about 0.25 and about 4.0 moles of the parent compound per mole of the nitro compound. Preferably, the mixture contains between about 0.5 and about 2.0 moles of parent compound per mole of nitro compound.

As pointed out in the preceding paragraph, the use of a molar excess of the parent compound and/or of the nitro compound gives better control of the reaction. It has been found that the use of other materials, such as water, nitrogen, carbon dioxide, and the like, as diluents, likewise provides better control of the reaction. Water is desirable when used in proportions of from about 10 to about 80 mole per cent, based on the sum of the molar quantities of the parent compound, nitro compound, nitric acid and water. Water is a product of the reaction and therefore, to a certain extent, dilution of the nitric acid when the latter is used as the nitrating agent, is not detrimental in a recycle or a continuous process. In this connection, when 100% nitric acid is used, the amounts and yields of mononitro and dinitro compounds obtained are generally lower than when dilute nitric acid is employed. Forty to seventy per cent acid is therefore preferable.

Temperature is a critical factor in the process since at temperatures of below about 150° C. no appreciable reaction takes place, while at temperatures of above about 250° C. decomposition of the product and mild explosions begin. Violent explosions occur when the temperatures reach 260–300° C. At these temperatures, the product obtained is alkaline in reaction, indicating the probable formation of amines. The temperature at which explosions are encountered is dependent on other variables, such as molar ratio and space velocity. Accordingly, the range of variation of temperature will vary for any given set of operating conditions. The preferred temperature range is from about 150° C. to about 230° C.

Pressure is another essential consideration in the process. At atmospheric pressure no dinitro compounds are formed. However, as the pressure is increased above about 150 pounds per square inch, the formation of dinitro compounds begins. Generally the rate of increase in the amount of conversion per pass increases with increases in pressure up to about 1200 pounds per square inch. Above about 1200 pounds per square inch the rate of increase falls off. Thus, while increasing the pressure from about 300 pounds to 900 pounds per square inch might increase the conversion 5 per cent, increasing the pressure from 1200 to 1800 pounds per square inch would increase the conversion only 2 per cent. Pressures in the range of about 200 to 2500 pounds per square inch probably include all that can be considered practical, whereas pressures of about 800–1200 pounds per square inch are preferred. One method of obtaining the desired temperature control is to circulate heat transfer salt around and through the reactor. Other methods will be apparent to those skilled in the art.

Any space velocity (i. e., the volume of reactants, measured as liquids, charged per hour per volume of reaction zone) in excess of 0.1 may be used. Preferably, however, the space velocity should be between about 0.5 and about 2.5.

The reaction chamber is preferably made of, or lined with, a non-reactant or corrosion resistant material such, for example, as stainless steel. It has been found that catalysts such as activated alumina, wood charcoal and a number of other materials promote undesirable side reactions. In general, therefore, catalytic operation offers little advantage, if any, over non-catalytic operation. The reaction zone may be either empty or may be packed with an inert solid material such as glass beads, porcelain chips, and the like. It is preferred to pack the reaction zone with an inert solid material in order to effect better mixing and contacting of the reactants. We have found, for example, that a stainless steel reactor packed with glass beads is satisfactory for the purposes of the present invention. However, packing is not essential.

In carrying out the process of our invention, the reactants may be metered by individual pumps, mixed cold, preheated, and the mixture charged into the reactor. When, for example, 70 per cent nitric acid and 2-nitropropane are among the reactants used in the process, they may be mixed in the desired molar proportions and then pumped using a single pump. When the reactants, or some of them, are not mutually miscible, separate pumps must be used.

When nitric acid is used as the nitrating agent, it has been found convenient, in small scale tests, to pump it by displacement with oil. When this is done it is desirable that the oil should be a highly paraffinic or naphthenic oil which will not react with the nitric acid. When $N_2O_4$ is used as the nitrating agent, the oil should be in contact with the $N_2O_4$ for as short a time as possible, otherwise violent reaction may result. In larger scale operations, the nitrating agent may be pumped or metered directly. Precautions should be taken to prevent any possibility of the nitrating agent mixing with the hydrocarbons in the system from which the hydrocarbons are supplied and to this end an excess of hydrocarbons should be maintained in the charging system while the operation is being started and adjusted. Check valves can be used to prevent any possibility of the nitric acid backing up into the hydrocarbon supply line.

Further details and advantages of this invention will be apparent from the following specific examples.

All runs were made at a temperature of 400° F. (204° C.) and at a pressure of 900 pounds per square inch. Seventy per cent nitric acid was used and the space velocity was adjusted to give approximately equal reaction. When propane is used it was found desirable to use a molar excess of hydrocarbon in order to control the reaction; this changed the space velocity slightly. For convenience, the operating conditions of each run are set forth in Table I.

*Table I*

| Run No. | Material Charged | Space Velocity | Moles of 2-nitropropane and/or propane divided by moles of nitric acid | Moles of propane divided by moles of 2-nitropropane | Moles of water divided by moles of nitric acid |
|---|---|---|---|---|---|
| 1 | 2-nitropropane | 1.0 | 1.0 | | 1.5 |
| 2 | propane | [1]2.0 | [1]1.5 | | 1.5 |
| 3 | 2-nitropropane +propane | [1]1.3 | [1]3.0 | 1.5 | 1.5 |

[1] When propane is employed, it is desirable to use an excess of propane and a high space velocity in order to obtain comparable results.

The conversion per pass to nitro derivatives obtained in these runs are set forth in Table II.

*Table II*

| Run No. | Material Charged in Addition to Nitrating Agent | Conversion Per Pass To— | |
|---|---|---|---|
| | | 2-nitropropane | 2,2-dinitropropane |
| | | Per cent | Per cent |
| 1 | 2-nitropropane | | 9.0 |
| 2 | propane | 6.3 | 2.6 |
| 3 | propane+2-nitropropane | 19.2 | 12.2 |

By operating in accordance with Run No. 3, separating the 2-nitropropane and recycling it, an excess of 2-nitropropane gradually is built up in the system because more 2-nitropropane is formed than is converted to 2,2-dinitropropane. However, by adjusting the molar ratio of the charge materials, i. e., by reducing the amount of propane charged, this can be prevented and the process operated continuously with only propane and nitric acid charged into the system and only 2,2-dinitropropane and water produced by it.

Although the process of this invention is peculiarly applicable to the preparation of 2,2-dinitropropane, it can also be applied to the formation of polynitroparaffins and polynitrocycloparaffins, using paraffins and cycloparaffins as charge materials, such as, for example, butane, pentanes, hexanes, neohexane, 2,3-dimethylbutane and cyclohexane.

The process of this invention may be made continuous by cooling the reaction mixture as it comes from the reaction zone, thus separating the oxides of nitrogen and unreacted propane, for example, from the liquid products. The liquid products may be separated into a nitric acid layer and a hydrocarbon layer. The hydrocarbon layer may then be distilled to recover and separate the 2-nitropropane and 2,2-dinitropropane. The 2-nitropropane may then be recycled to the process. The oxides of nitrogen may be reconverted to nitric acid and recycled along with the recovered nitric acid and propane. Additional nitric acid and propane will, of course, be added to maintain continuous operation. Numerous possible variations and modifications of such a continuous process will be apparent to those skilled in the art.

What is claimed is:

1. The process of preparing 2,2-dinitropropane that comprises reacting a mixture of 2-nitropropane and propane with a nitrating agent at a temperature between about 150° C. and about 250° C., at a pressure in excess of about 150 pounds per square inch and at a space velocity in excess of about 0.1.

2. A process of preparing a polynitroparaffin having at least three carbon atoms, and characterized by the attachment of at least two nitro groups to other than primary carbon atoms, which comprises reacting a mixture of a nitroparaffin having at least one less nitro group than the said polynitroparaffin, and a paraffinic hydrocarbon having the same number of carbon atoms and the same carbon atom structural configuration as the said nitroparaffin, with a nitrating agent, at a temperature of from about 150° C. to about 250° C., at a pressure in excess of about 150 pounds per square inch and with a space velocity in excess of about 0.1, said nitroparaffin reactant having at least three carbon atoms and being characterized by the attachment of its nitro groups to other than primary carbon atoms and being further characterized by the attachment of at least one hydrogen atom to other than a primary carbon atom.

3. A process for preparing a polynitroparaffin having at least 3 carbon atoms and not more than 5 carbon atoms in the molecule, and characterized by the attachment of at least 2 nitro groups to other than primary carbon atoms, which comprises reacting a mixture of a nitroparaffin having at least one less nitro group than the said polynitroparaffin, and a paraffinic hydrocarbon having the same number of carbon atoms and the same carbon atom structural configuration as the said nitroparaffin, with a nitrating agent, at a temperature of from about 150° C. to about 250° C. and at a pressure in excess of about 150 pounds per square inch, while moving the reactant mixture through a reaction zone at a space velocity in excess of 0.1, said nitroparaffin reactant having at least 3 carbon atoms and not more than 5 carbon atoms in the molecule and being characterized by the attachment of its nitro groups to other than primary carbon atoms and being further characterized by the attachment of at least one hydrogen atom to other than a primary carbon atom.

4. A process for the preparation of a gem-dinitroparaffin having from 3 to 5 carbon atoms characterized by the attachment of the two nitro groups to a secondary carbon atom, which comprises: reacting a mixture of a mononitroparaffin having from 3 to 5 carbon atoms and having the nitro group attached to a secondary carbon atom, and a paraffinic hydrocarbon having the same number of carbon atoms and the same carbon atom structural configuration as the said mononitroparaffin, with a nitrating agent at a temperature from about 150° C. to about 250° C. at an elevated pressure in excess of about 150 pounds per square inch, while moving the reactants through a reaction zone at a space velocity in excess of about 0.1.

5. A process of preparing 2,2-dinitropropane which comprises reacting a mixture of 2-nitropropane and propane with nitric acid at a temperature between about 150° C. and about 250° C., at an elevated pressure of from about 800 to about 1,200 pounds per square inch and with a space velocity between about 0.5 and about 2.5.

6. A process of preparing 2,2-dinitropropane which comprises reacting a mixture of 2-nitropropane and propane in the ratio of from about 0.25 to about 4 mols of propane to per mol of 2-nitropropane with nitric acid at a temperature between about 150° C. and about 250° C., at an elevated pressure of from about 800 to about 1,200 pounds per square inch and with a space velocity between about 0.5 and about 2.5.

WILLIAM I. DENTON.
RICHARD B. BISHOP.
EDWIN M. NYGAARD.

REFERENCES CITED

The following references are of record in the file of this patent:

UNITED STATES PATENTS

| Number | Name | Date |
|---|---|---|
| 2,382,241 | Levy | Aug. 14, 1945 |
| 2,394,315 | Levy | Feb. 5, 1946 |
| 2,418,241 | Stengel et al. | Apr. 1, 1947 |
| 2,425,367 | Denton et al. | Aug. 12, 1947 |